United States Patent Office

2,908,591
    Patented Oct. 13, 1959

2,908,591

METHOD OF PRODUCING STRUCTURAL PARTS OF A COMBINATION OF GLASS AND PLASTICS

Werner Sack, Mainz, Germany, assignor to Jenaer Glaswerk Schott & Gen., Mainz, Germany, a corporation of Germany No Drawing. Application March 11, 1957
    Serial No. 645,011

Claims priority, application Germany March 15, 1956

1 Claim. (Cl. 117—124)

The present invention relates to a new method of producing structural parts consisting of glass-reinforced plastics and particularly unsaturated polyester resins.

Glass-reinforced polyester plastics are being used increasingly for various purposes because of their excellent mechanical properties and their relatively simple method of production.

Aside from the so-called thermoplastics which are usually manufactured by injection molding or by extrusion, and aside from the synthetic resins which may be worked up and hardened under heat and pressure, the polyester plastics also belong in the class of casting resins because of their liquid consistency. After catalysts have been added thereto, such casting resins may be hardened at room temperature or at temperatures up to about 100° C., depending upon the action of the added catalysts. Such hardening therefore does not require any particular amount of pressure or heat.

Because of their low mechanical resistance, casting resins by themselves have not acquired any particular industrial value. They did not acquire any really practical importance until products made of glass fibers, such as glass-silk fabrics, glass-silk webs or strands, or the like, were embedded therein. Such embedding of glass fibers then permitted the use of the relatively simple method of stratified construction to produce large-surface products such as boat hulls, car bodies, and the like which previously could not be produced by means of other synthetic materials. The excellent strength factors of this novel material are, however, considerably dependent upon the amount, kind, and properties of the respective glass-fiber product embedded therein. This also applies to the chemical stability of glass-fiber-reinforced polyester resins since it is strongly affected by the ingredients of the glass used for making the glass fibers, particularly if these materials come into contact with moisture. In the course of the development of such reinforced materials it was found that the glass used for such purpose should not have an alkali content higher than 1%. This is based upon the fact that the moisture will cause an elimination of the alkalies so that the basically reacting interfacial film will result in a destruction of the synthetic material in the form of a saponification, whereby the good mechanical properties of the glass-fiber-reinforced polyester resins will be lost.

It is an object of the present invention to provide a method of producing synthetic materials which do not possess the disadvantages mentioned above.

Another object of the present invention is to provide a method of producing structural parts of a combination of glass products and casting resins, particularly unsaturated polyester resins, wherein the molded bodies which are formed of sintered glass powder are impregnated with solutions of unsaturated polyester in liquid polymerized mono-capillary compounds, and the synthetic resin is then hardened in a manner known as such.

Another object of the invention consists in carrying out the impregnation of the molded glass bodies in a vacuum.

A further object of the invention is to provide a method of the type as described whereby the individual glass granules are fused together at their points of contact so that the final sintered material will be traversed by a cohesive capillary system.

The latter result is of greatest importance for the further treatment of the material. A product with separate hollow spaces therein, such as the well-known foam glass, is entirely unsuitable for the purpose of the present invention. The average diameter of the pores in glass may be varied by the application of different granular sizes and/or by the application of pressure during the sintering process. The liquid polyester resin is then drawn into the sintered bodies, preferably under a vacuum, and hardened. Similarly as in the manufacture of glass-fiber products, it is also in the present case necessary for attaining a proper and lasting adhesion between the glass and the synthetic material that a suitable finish be applied to the sintered body before the same is embedded in the polyester resin.

The material produced according to the invention is to be regarded as a supplement to the glass-fiber-reinforced polyester resins. In accordance with the difference in structure of the two materials, the polyester resins which are reinforced by the sintered glass are, because of the three-dimensional capillary system, especially capable of taking up considerable pressure. It will particularly emphasize the practical value of the new material if the so-called "cold flow" of synthetic plastics will be considered. This term expresses the characteristic that synthetic plastics as such already begin to flow and to change in shape while still in a cold condition. A three-dimensional, irregularly cross-linked insert, such as sintered glass powder, will provide such a material with a greater stability against such deformation than unidimensional or two-dimensional inserts as formed by glass-fiber inserts, such as strands or fleeces.

The method according to the present invention will permit a very simple production of, for example, tiles for covering floors and walls, molded products, for example, of the standard size of a brick for building purposes, or molded products such as insulators for electrical purposes finally shaped from the previous products by machining. A multitude of other products may be made according to the method of the invention, among then tubular sections and pipes.

Any such products may thus be produced according to the invention by sintering the glass powder while molding the material simultaneously into the proper shape, sucking in the polyester, and hardening the same, or by means of a subsequent treatment, for example, by machining a block of sintered glass and polyester resin which has already been hardened.

There is one more important advantage of the manufacture of sintered glass over that of glass fibers which should be mentioned. Generally speaking, glass fibers are produced from a molten mass of glass by drawing or by centrifugal action. However, in order to render such a production economical, the range of viscosity of the glass at the temperature of working up the glass must be kept within very narrow limits. The methods of production of glass fibers as presently known do not permit highly viscous types of glass to be thus worked up in a liquid state. This is of no concern in the manufacture of sintered glass since here it is the softening point of the glass which is of importance and is always a few hundred degrees centrigrade lower than the operating temperature necessary for producing glass fibers. This means that, while the possibility of varying the chemical composition of glass used for making glass fibers is very limited, there is no such limitation in the types of glass used for making sintered glass. Consequently, for producing such glass even the most chemically-stable types of glass may be used without difficulty and practically without any regard to the viscosity of the glass. The importance of this fact upon the chemical stability of the sinter glass-plastic composition will be evident from the previous statements.

While the invention has been described in detail with reference to certain now preferred examples and embodiments thereof, it will be understood by those skilled in the art that various changes and modifications may be made without departing from the spirit and scope of the invention as defined in the appended claim.

Having thus fully disclosed my invention, what I claim is:

A new article of manufacture comprising a molded body consisting of a combination of glass and unsaturated polyester wherein said glass is contained in the form of a body of sintered glass powder and the polyester is impregnated within the intercommunicating pores of said glass body, which pores are formed during the sintering by the fusion of the individual glass granules at their points of contact.

References Cited in the file of this patent

UNITED STATES PATENTS

| | | |
|---|---|---|
| 1,922,221 | Steenbeck et al. | Aug. 15, 1933 |
| 2,456,093 | Swedlow | Dec. 14, 1948 |
| 2,714,227 | Graham et al. | Aug. 2, 1955 |